United States Patent Office 3,346,867
Patented Oct. 10, 1967

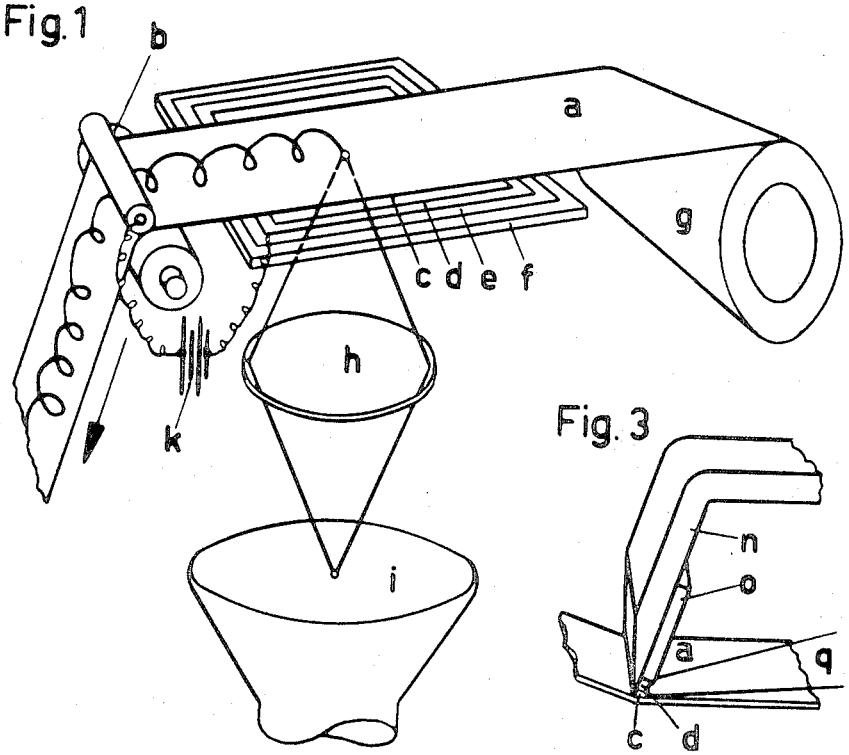

3,346,867
ELECTRO-OPTICAL LINE RECORDER
Fritz Schwarzer, Barmannstrasse 38, Munich-Pasing, Germany
Filed May 6, 1965, Ser. No. 453,670
Claims priority, application Germany, May 6, 1964, Sch 35,115
7 Claims. (Cl. 346—33)

The present invention relates to apparatus to directly record the trace of a line formed by a bright spot of light moving across a screen, and more particularly to such a recorder utilizing a recording medium which is sensitive to electrical potential.

Various line recorders operating according to different principles are known. The most commonly used recorders of such type usually utilize a scribe or pen which may be supplied with ink, electrical potential or heat; and in which the pen or scribe is moved across a recording medium, such as plain paper, electrically sensitive paper, heat sensitive paper or the like, in accordance with a control signal. Converting the variations of the control signal into deflections of the pen had the disadvantage that as the frequency of the deflection increases, the inertia of the recording element prevents accurate recording of the signal.

It has, therefore, been proposed to provide photographic recording apparatus dispensing with any mechanical recording styli, and utilizing rather a narrow beam of ultraviolet light, the position of which is controlled by the signal. This beam of light of course has no inertia. Thus, the upper limit of frequency is high. In spite of the advantageous results, such recorders have not been utilized to a great extent because of the high cost of the recording medium and the necessity to develop and later fix the recording medium in order to obtain acceptable resolution. Additionally, special precautions have to be taken to operate such apparatus in daylight, and to provide for daylight loading and unloading of the recording medium.

Another known form of recorder utilizes a thin jet of ink which is ejected through a movable nozzle perpendicularly against the paper. The upper limit of frequency which can be recorded with such apparatus is given by the time taken by the jet to leave the nozzle and impinge on the paper. This time is of course large with respect to a light controlled recording apparatus. The upper limit of frequency of such a recorder is approximately 1,000 cycles. Another system utilizes an electrolytic recording method in which the recording point can be controlled practically without inertia; the upper limit of frequency of such apparatus is, however, given by the lack of resolution at higher frequencies and thus it, like many of the mechanical recorders, has an upper recording limit of frequency of about 100 cycles.

It has been proposed to utilize electrically sensitive recording media, for example electrosensitive paper, and control the recording position by application of a potential applied over a photoresistive material, which is illuminated in discrete positions by means of a beam of light. A plurality of parallel, elongated semiconductor elements, having elongated parallel resilient recording points in engagement with the paper, have been used. Such recording apparatus requires a narrow, yet elongated light beam; and the plurality of resilient recording styli permit recording only of discontinuous line segments extending parallel in the direction to the paper feed.

It is an object of the present invention to provide for an electro-optical recorder having high resolution, high frequency response, and capable of recording a continuous line.

Briefly, in accordance with the present invention, a thin layer of photosensitive resistance material is located to be illuminated by a spot of light. The layer of photosensitive resistance material is of such thickness that the resistance across the layer in the region where the spot of light illuminates it will be small. The dark resistance of the material, however, is substantial and in the regions where it is not so illuminated, the material will retain its dark resistance. A current sensitive recording medium is arranged close to the layer of photosensitive resistance material; and an electrical current transfer means, for example a thin layer of fairly high resistance material is in contact with both the photosensitive resistance material and the current sensitive recording medium. A transfer voltage is applied across the photosensitive resistance material and the electrical current sensitive recording medium, for example by contacting the medium with a conductive roller. In the direction where the spot of light has illuminated the photosensitive resistance material, its resistance has dropped. The layer of electrical current transfer material is so thin that the resistance in the direction transverse to its thickness is small in comparison with the resistance laterally thereof. Thus, electrical current will pass from the photosensitive material to the current sensitive recording medium, and cause recording at the point and location where the light spot has illuminated the photosensitive resistance material. The entire arrangement may be substantially two-dimensional, that is applied on a plate, for example a glass plate, and exposed to a flying spot scanner or other cathode ray tube. If the recording medium is movable, the arrangement may be essentially one-dimensional, that is the recording may take place along an edge, and the recording medium may be movable, for example by passing a strip of paper from a pay-out to a take-up reel. The electrical current transfer means may be formed of a resistance material or of a plurality of thin lamellae, insulated from each other and located next to each other, in contact with the photosensitive resistance material and the paper. In this case the spot of light is preferably so chosen that it is wide enough to cover the width of two lamellae, so that a continuous line will be formed on the current sensitive paper as the spot moves laterally of the photosensitive resistance material.

The structure, organization and operation of the invention will now be described more specifically in the following detailed description with reference to the accompanying drawings, in which:

FIG. 1 is a schematic diagram of a recorder according to the present invention in which the photosensitive resistance material is applied on a support plate;

FIG. 2 is an embodiment illustrating recording along an edge;

FIG. 3 is an enlarged partial view of the recording edge of FIG. 2; and

FIG. 4 illustrates an embodiment of the invention utilizing lamellae at the recording edge.

Referring now to the drawings: FIG. 1 illustrates a form of the invention useful for both stationary and movable recording media. When the recording medium is stationary, deflection of a spot of light in two coordinates generates lissajou figures. With a movable recording medium, as shown in the drawings, deflection of a spot of light in one coordinate direction results in recording on a time base, or time axis. Combination of recording in two coordinate directions with motion of the recording medium is likewise possible, as utilized for example in vectorcardiography, having a continuous time axis.

FIG. 1 illustrates an arrangement for the generation of lissajou figures, as well as for use with a continuous time axis. Electrosensitive recording medium $a$, stationary for recording of lissajou figures, or continuously movable, as desired, for example by means of transport rollers $b$ in the direction of the arrow, is in contact with an electrical conductor member formed as a layer $c$. Layer $c$ is a thin layer of a high resistance material which is in intimate electrical contact with a layer of photosensitive resistance material $d$. Over layer $d$ a thin, transparent conductive layer $e$ is applied, and the entire assembly is supported on a glass plate $f$. $g$ is a supply roll for recording medium $a$. A lens $h$ focuses a light spot from a flying spot scanner, or an electron beam tube $i$ through glass plate $f$, on the assembly of layers $e$, $d$, $c$. The photosensitive resistance layer $d$ thus has an image of the light point from tube $i$ applied thereto, which image wanders over the face of the layer $d$ in accordance with the deflection of the spot from tube $i$. A source of biasing potential $k$ is connected to the transparent electrode $e$ on the one hand, and to a conductive roller, for example $b$, in contact with the recording medium $a$. Thus, a closed circuit will be formed from source $k$ through electrode $e$, photosensitive resistance layer $d$ where illuminated by the image of light spot from tube $i$, resistance layer $c$, and recording medium $a$ and back to conductive roller $b$ and the source $k$. The thin resistance layer $c$ provides for a protective coating to the mechanically more delicate photosensitive resistance material layer $d$, and further can be formed to have a smooth surface over which recording medium $a$ can pass, without danger of wear or scratching of photosensitive resistance layer $d$. In addition, the fact that the layer does have some resistance provides electrical protection against overloading of the photosensitive resistance material. By suitable choice of the specific resistance of this layer, the current in the direction photolayer $d$—recording medium $a$—has to overcome only a small resistance, due to its short path, whereas in the lengthwise, that is lateral directions, it would have a large resistance to overcome so that portions adjacent the light spot image from tube $i$ will have no effect on the recording medium $a$, thus providing for sharpness of projection.

If it is not necessary to record in two coordinate directions, it is possible to simplify the apparatus. Referring now particularly to FIGS. 2 and 3, if the spot of light is to be deflected in only one direction, pure transverse recording with respect to a time basis can be easily obtained. Recording can of course be done by more than one spot of light if synchronous recording of more than one signal is desired. FIG. 2 again illustrates the recording medium $a$, from a supply reel not shown, and guided over a guide roller $l$, passing a recording position $m$ and being pulled off by transport roller $b$. Recording position $m$ comprises an edge $n$ (FIG. 3) consisting of insulating material and arranged preferably in line form. Resistance layer $c$, photosensitive layer $d$, and an electrode in contact therewith $o$, are applied against the edge $n$. Electrode $o$ is connected to the source $k$, which in turn is connected to a contacting roller $p$, contacting the recording medium. A light beam $q$ is deflected by means of a mirror $r$ to the photosensitive layer $d$. Depending upon the deflection of an oscillograph, light point $q$ will travel laterally of the photosensitive resistance material layer $d$, thus lowering the resistance beneath that layer and causing recording on the recording medium. The spot of light can be obtained of course not only from a flying spot scanner or cathode ray tube $i$, as shown in FIG. 1, but also from other means such as mechanical mirror oscilloscopes.

FIG. 4 illustrates a variation of the embodiment according to FIG. 2, in which the current is applied to the recording medium by means of assembled lamellae, or a material equivalent thereto, that is one having a high degree of conductivity in a first direction, and a high degree of resistance in a direction transverse thereto. Referring now to FIG. 4, electrode $o$ (similar to FIG. 3) is in contact with a layer of photosensitive resistance material $d$. An assembly of lamellae $s$, in contact with layer $d$, is secured to the support $n$, shown broken away. The lamellae are of conductive material, and insulated from each other; their points, in assembly, form a continuous line transverse to the direction of feed of the recording medium, and thus provide for a recording edge. Those lamellae which are at a position in which the photosensitive layer $d$ is dark, and thus of high resistance, will not carry current to the recording strip $a$; those lamellae, however, which are in contact with a region of layer $d$, illuminated by a beam of light $q$, and reflected by the mirror $r$, will effect a low resistance connection between the electrode $o$ and the recording medium $a$. The spot of light focused on the layer $d$ is preferably wider than the width of any one of the individual lamellae $s$, in order to enable the recording of a continuous line on medium $a$. Thus the conductivity of the circuit which is established through the surface of medium $a$ is high with respect to directions longitudinally of said surface, due to the insulation of the lamellae. The conductivity is taken with respect to the surface $a$, and "through" or "transverse" to the surface refers to the effect on said surface and not necessarily to the physical relationship of the lamellae with respect thereto.

The present invention has the advantage that contrary to known photographic direct recording apparatus, recording even at comparatively high frequencies will be clear and of sufficient contrast since the recording occurs instantaneously under action of the electrical current from battery $k$, and is independent of time of exposure. Furthermore, no chemical developing or fixing is necessary, and the electrosensitive recording media $a$ are inexpensive. They may be electrochemically active, or may consist of metal-paper foils, in which recording is made visible by means of electrochemical or electrophysical processes.

A suitable material for photosensitive resistance layer $d$ is cadmium-sulfide or indium-antimonid; this layer may be approximately 0.1–1 millimeter thick.

A suitable material for the electrical current transfer resistance material layer $c$ is carbon resistance material, having a volume resistivity of circa 0.1–1 mohm-centimeter; this material may be applied with a thickness of approximately circa 0.01–0.1 mm. (microns).

The recording medium $a$ may, for example be formed of paper having a metallized layer of aluminum applied thereto; such paper can operate with a potential from source $k$ of about 2–10 volts.

Lamellae $s$ may be made, for example of steel or hard bronze, insulated by lacquer, or thin paper foils.

The invention has been illustrated and described as embodied in an optical-electrical line recorder. It is not intended to be limited to the details shown. Various structural changes and modifications, as determined by the requirements of particular applications or uses may be made, without departing from the inventive concept.

I claim:

1. In a line recorder to record traces on a surface having a current sensitive recording medium ($a$) a thin layer ($d$) of photosensitive resistance material having a dark resistance large with respect to the resistance of the material where illuminated; means establishing electrical contact (FIGS. 1–3: $e$; FIG. 4: $o$) of one side of said layer of photosensitive resistance material ($d$) with said recording medium and means applying a potential difference ($b$; $k$) across the other side of said layer ($d$) of photosensitive resistance material and said recording medium the improvement comprising an electrical conductor member ($c$) having an electrical conductivity in a direction transverse to said surface which is large with respect to the conductivity parallel to said surface, said electrical conductor member ($c$) being in series circuit with said means establishing electrical contact ($e$, $o$) and said potential applying means ($b$, $k$).

2. A line recorder as claimed in claim 1, and wherein said electrical conductor member ($c$) includes a thin layer of material having an electrical conductivity transverse to said surface which is large with respect to the conductivity parallel to said surface, said thin layer of material being applied between said layer of photosensitive resistance material (d) and said recording medium (a).

3. A line recorder as claimed in claim 1, wherein said electrical conductor member (c) includes a plurality of stacked lamellae (FIG. 4: s), insulated from each other and extending between said layer of photosensitive resistance material (d) to, and in contact with said recording medium (a).

4. In a line recorder as claimed in claim 3, including means illuminating said layer of photosensitive resistance material with a spot of light, the improvement wherein said spot is at least as wide as the thickness of two lamellae.

5. A line recorder as claimed in claim 1, wherein said electrical conductor member (c) is in form of an edge contacting said recording medium (a) said photosensitive resistance material (d) is in the form of a narrow strip adjacent said edge.

6. A line recorder as claimed in claim 5, wherein said current sensitive recording medium (a) is in strip form and transport means are provided passing said strip over said edge.

7. In an electro-optical recorder, means generating a point-form spot of light; a thin layer of photosensitive resistance material located to be illuminated by said spot of light and of such thickness that the resistance across said layer in the localized region illuminated by said spot will drop, while, where not illuminated, the dark resistance of said material will remain; a current sensitive recording medium having a recording surface; electrically conductive transfer means formed as a body of material having an electrical conductivity in a direction transverse to said surface which is large with respect to its conductivity in directions longitudinal of said surface, in electrical series circuit with said photosensitive resistance material and said recording medium; and means impressing an electrical potential across said photosensitive resistance material, said electrically conductive current transfer means, and said recording medium.

References Cited

UNITED STATES PATENTS

| | | | |
|---|---|---|---|
| 907,235 | 12/1908 | Herrick | 346—35 |
| 2,432,303 | 12/1947 | Fox | 346—74 |
| 2,898,468 | 8/1959 | McNaney | 346—110 |
| 2,925,310 | 2/1960 | Perkins | 346—33 |
| 2,963,335 | 12/1960 | Hall et al. | 346—33 |
| 3,082,085 | 3/1963 | Miller et al. | 346—74 |
| 3,162,860 | 12/1964 | McNaney | 346—74 |

RICHARD B. WILKINSON, *Primary Examiner.*

MICHAEL LORCH, *Assistant Examiner.*